United States Patent [19]

Story et al.

[11] Patent Number: 6,081,807
[45] Date of Patent: Jun. 27, 2000

[54] METHOD AND APPARATUS FOR INTERFACING WITH A STATELESS NETWORK FILE SYSTEM SERVER

[75] Inventors: Glenn Story, Palo Alto; Amardeep S. Sodhi, Fremont; Gary Tom, San Jose; Mon For Yee, San Francisco, all of Calif.

[73] Assignee: Compaq Computer Corporation, Cupertino, Calif.

[21] Appl. No.: 08/874,426

[22] Filed: Jun. 13, 1997

[51] Int. Cl.⁷ .................................................. G06F 17/30
[52] U.S. Cl. .......................... 707/101; 707/10; 707/100; 707/102; 707/200; 707/8
[58] Field of Search ............................ 707/1, 100, 101, 707/102, 200, 8, 10; 395/683

[56] References Cited

U.S. PATENT DOCUMENTS

| | | | |
|---|---|---|---|
| 5,202,971 | 4/1993 | Henson et al. | 395/425 |
| 5,355,453 | 10/1994 | Row et al. | 395/200 |
| 5,388,231 | 2/1995 | Starr | 710/105 |
| 5,485,579 | 1/1996 | Hitz et al. | 709/221 |
| 5,513,314 | 5/1996 | Kandasamy et al. | 714/6 |
| 5,537,645 | 7/1996 | Henson et al. | 395/650 |
| 5,701,516 | 12/1997 | Cheng et al. | 710/22 |
| 5,737,536 | 4/1998 | Herrmann et al. | 395/200.59 |
| 5,778,384 | 7/1998 | Provino et al. | 707/200 |
| 5,802,366 | 9/1998 | Row et al. | 395/683 |
| 5,813,016 | 9/1998 | Sumimoto | 707/201 |
| 5,828,876 | 10/1998 | Fish et al. | 395/601 |

OTHER PUBLICATIONS

Smith "MLS File Service for Network Data Sharing" IEEE Database, pp. 94–99, Jul. 1993.
Bhide et al. "A Comparison of Two Approaches to Build Reliable Distributed File Servers" IEEE Database, pp. 616–623, Jul. 1991.

*Primary Examiner*—Paul V. Kulik
*Assistant Examiner*—Michael J. Wallace, Jr.
*Attorney, Agent, or Firm*—Fenwick & West LLP

[57] ABSTRACT

A method and apparatus for interfacing with a stateless NFS (Network File System) server. A pseudo-open state is created for a file when a request from a network client for accessing the file is received in a network server. The term pseudo-open data relates to a set of data that is kept in a network server. The pseudo-open describes the state of a file being currently accessed via an NFS server in the network server. The pseudo-open data differs from normal file state data in that it can be created or recreated at will, thus preserving the stateless functionality of the NFS server. Thus, if a request is received at any time and there is no pseudo-open state established for the file, the pseudo-open state will be established or reestablished at that time. If, on the other hand, a request is received for which a pseudo-open state already exists, the overhead of creating the pseudo-open state is avoided, and the existing data is used. The pseudo-open state is stored in a file-system data structure called VNODE. Each active file has an associated VNODE. The pseudo-open state of a file can be then closed. The state of the file can be changed to a higher or lower level of access privilege via open-promotion or open-demotion operations, respectively. Open-demotion refers to the change of a file state to a lower level of access privilege.

29 Claims, 6 Drawing Sheets

METHOD AND APPARATUS FOR INTERFACING WITH A STATELESS NETWORK FILE SYSTEM SERVER

BACKGROUND OF THE INVENTION

The present invention relates to a method and apparatus for operating a network server in a network environment, and more particularly relates to a method and apparatus for interfacing with a stateless NFS (Network File System) server.

In a typical network environment, a plurality of network clients are coupled to one or more network servers for accessing files in the network server. When an application program in a network client executes, it calls an operating system in the network client to open a file, or to store and retrieve data in files. A file access mechanism in the network client accepts the request and automatically passes it either to local file system software or to NFS client software in the network client, depending on whether the file is on the local disk or on a remote network server. When it receives a request from the file access mechanism, the NFS client software uses the NFS protocol to contact the remote network server to perform the requested operation and return results to the NFS client software. When the remote network server replies, the NFS client software returns the results to the application program in the network client.

The NFS protocol is defined in various standards documents, e.g., "NFS: Network File System Protocol Specifications," Sun Microsystems, Inc., RFC (Request for Comment) 1094, which is hereby incorporated by reference. The NFS protocol requires a "stateless server." This means that the state of interactions between the server and a client are not to be tracked or managed by the server during a session. Thus, if a client makes a request to a server, and after satisfying that request the server fails and is restarted, the server must be able to handle subsequent related requests from the client without needing to access state data that was lost when the server failed.

In general, this statelessness is achieved because each request has sufficient information to completely define the request. Whatever state is required is saved in the client and passed to the server with each request. In particular, the NFS protocol defines a data structure called a "file handle." The file handle contains sufficient information to uniquely identify the file to be accessed. The advantage and purpose of a stateless server is to improve robustness by being able to continue file access in spite of the failure and restart of the file server.

However, traditional file access, and therefore the operating-system mechanisms to support it, are "stateful," i.e., there is state information saved in the file system about a file from the time file access begins (via an open system call) until file access is terminated (via a close system call). Thus, there are problems associated with implementing a stateless file server. On many operating systems, to have to recreate this state information for each read or write operation adds significant system overhead and reduces system performance to an unacceptable degree.

An additional problem of conventional systems has to do with specifying how a file is to be accessed. This is mainly important for security checking to determine the file access privilege that is permitted for a particular request. In a typical operating system, the "open" system call specifies whether the request needs read access, write access or both. Since there is no open request in the NFS protocol, there is no way for the server to know the access intentions of the client, other than by the READ and WRITE requests that it makes to the server. The simple solution is to always assume both read and write access. However, if the access intention is for read-only, both read and write access is granted. Requesting write access to a file can cause problems, such as a disk process in the server restricting the caching of data for that file in other CPUs. This restriction has a negative impact on performance and should be avoided. Moreover, opening a file for write access also possibly locks out, for that file, other file openers in the operating system for the duration of that open.

Therefore, there exists a need for an improved method and apparatus for interfacing with a stateless NFS server that reduces unnecessary system overhead and enhances system performance.

SUMMARY OF THE INVENTION

The present invention provides a method and apparatus for interfacing with a stateless NFS server. According to a preferred embodiment of the invention, a "pseudo-open" state is created for a file when a request for accessing the file is received in a network server from a network client. The term pseudo-open relates to a set of data that is kept in a network server. The pseudo-open data describes the state of a file being currently accessed via an NFS server in the network server. In a preferred embodiment, the pseudo-open data is kept partially by a file system and partially by a disk process. The pseudo-open data differs from normal file state data in that it can be created or recreated at will, thus preserving the stateless functionality of the NFS server. Thus, if a request from the network client is received by the network server at any time and there is no pseudo-open state established for the file, the pseudo-open state will be established or reestablished by the file system at that time. If, on the other hand, a request from the network client is received for which a pseudo-open state already exists, the overhead of creating the pseudo-open state is avoided, and the existing data is used. The pseudo-open state is stored in a file system data structure called a VNODE. Each active file in a server has an associated VNODE. One distinction between an ordinary open and a pseudo-open is that the security permission is not checked in the case of pseudo-open.

The present invention also provides an apparatus and method for performing an "open-promotion" operation on a file in a network server. Open-promotion refers to the change of a file state to a higher level of access privilege. According to the invention, when a READ request is received from a network client, a read-only psuedo-open state is created on the file. When a subsequent WRITE request from the network client is received, instead of closing the file and then issuing a new pseudo-open request for read/write access, the file system in the network server sends an "open-promotion" message to the disk process in the network server to change the state of the file from read-only to read and write. The open-promotion operation can also be used to change the state of the file from write-only to read and write. Additionally, the open-promotion operation can be applied to ordinary open requests as opposed to pseudo-open requests.

The present invention further provides an apparatus and method for closing the pseudo-open state of a file in a network server. According to a preferred embodiment of the invention, a counter is associated with each file. Whenever a READ, WRITE, or other NFS request is received by the network server, a file manager in the network server sets an associated counter to a maximum value pre-configured by a user. A separate process called herein the file manager will, when it is not busy with other work, wake up periodically on a timer. At such times, it scans all VNODEs. If a VNODE has a pseudo-open state with a non-zero counter, then the counter is decremented by one and the pseudo-open is left in place. On the other hand, if a VNODE has a pseudo-open state and its counter is zero, then the pseudo-open state is terminated by the file manager. If no other processes in the server are using the file, then the VNODE is deleted from memory.

Additionally, the present invention provides an apparatus and method for performing an "open-demotion" operation on a file in a network server. Open-demotion refers to the change of a file state to a lower level of access privilege. According to a preferred embodiment of the invention, a read counter and a write counter are associated with each file. Whenever a READ, WRITE, or other NFS request is received by the network server, the file manager sets the associated read counter to a first maximum value or the associated write counter to a second maximum values, depending on whether an NFS READ or WRITE request is processed. When it is not busy with other work, the file manager periodically scans all VNODEs. If a VNODE has a pseudo-open state with a non-zero read counter but a zero write counter, the file manager sends an open-demotion request to the disk process to change the state of the pseudo-open from read and write to read only. This allows more flexible caching of the file and also prevents denial of access to the file from other processes.

Other objects and attainments together with a fuller understanding of the invention will become apparent and appreciated by referring to the following description and claims taken in conjunction with the accompanying drawings.

DETAILED DESCRIPTION OF PREFERRED EMBODIMENTS

Figure 1:
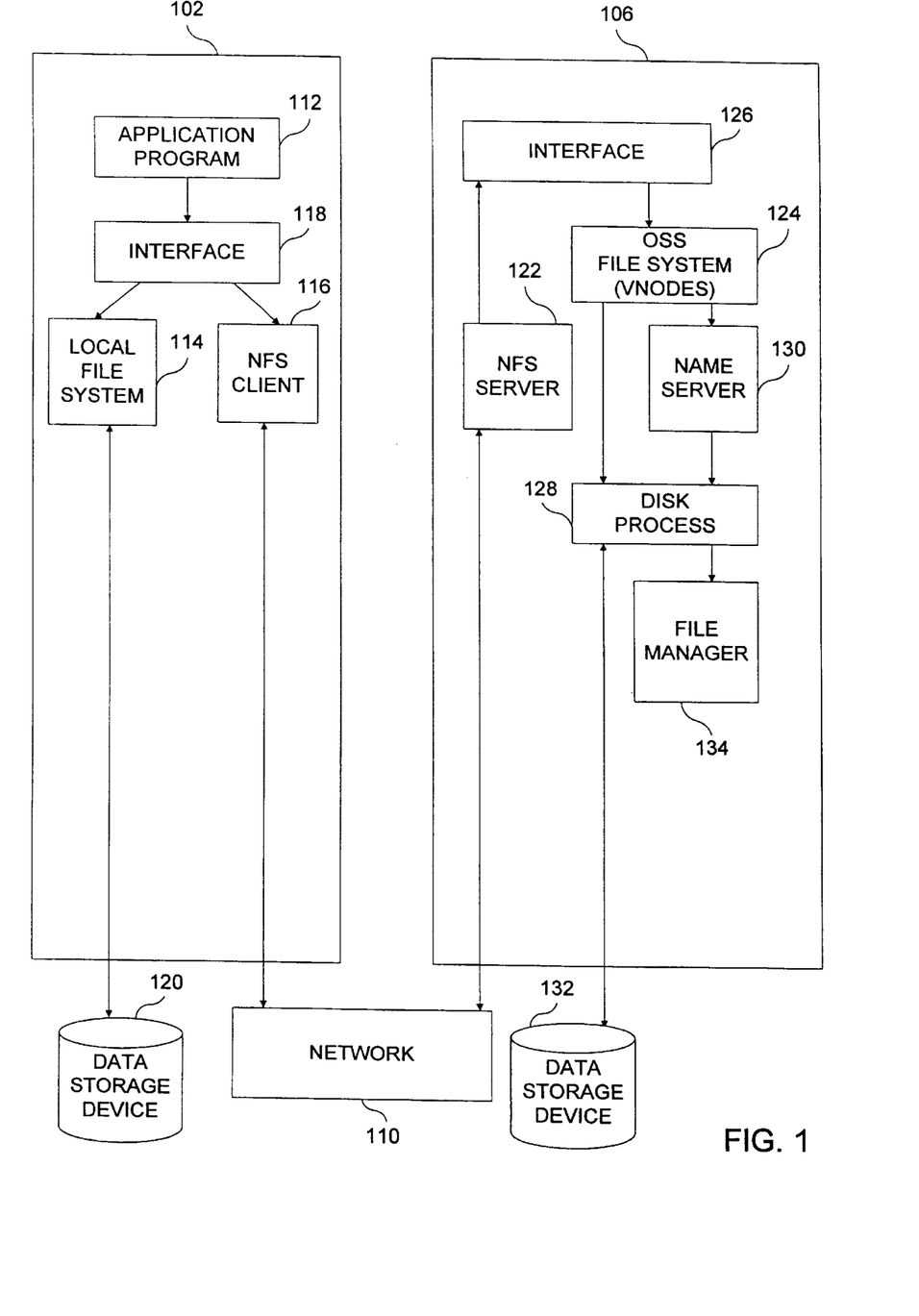
FIG. 1 shows a functional block diagram of a network system according to a preferred embodiment of the invention.

FIG. 1 illustrates a functional block diagram of a network system according to a preferred embodiment of the present invention. In FIG. 1, a network client 102 is coupled to a network server 106 via a network connection 110. In network client 102, an application program 112 is linked to a local file system 114 and an NFS client 116 via an interface 118. Local file system 114 is linked to a data storage device 120. NFS client 116 may access network server 106 via network connection 110.

In network server 106, NFS server 122 is linked, via an interface 126, to a disk file system, such as an OSS (Open Systems Services) file system 124 developed by and available from Tandem Computers Incorporated, Cupertino, Calif. The phrase "file system" has several distinct meanings in computer science. As used in the application, unless otherwise qualified, a "file system" refers to a body of software designed to store, organize, protect, and retrieve data using some storage medium such as disk. OSS file system 124 is linked to a disk process 128 and a name server 130 which is also linked to disk process 128. Disk process 128 is linked to a data storage device 132 and a file manager 134. It should be understood that, in the embodiment of FIG. 1, elements 112, 114, 116, 118, 122, 124, 126, 128, 130 and 134 are implemented as software programs stored in memory and executed by one or more respective processors (not shown).

When application program 112 executes, it calls an operating system via interface 118 to access a file, for example, to open a file. A file access mechanism which is part of interface 118 takes the request and passes it to either local file system 114 or NFS client 116, depending on the location of the file. If the file is stored in data storage device 120, local file system 114 will receive the request and process it. On the other hand, if the file is located in network server 106, NFS client 116 will receive the request and use the stateless NFS protocol to contact network server 106.

An NFS LAN interface process (not shown) in network server 106 receives an NFS request for accessing a file from NFS client 116 via, for example, a TCP/IP process (not shown). The interface process then dispatches the request to NFS server 122. The interface process also receives responses from NFS server 122 and transmits them back to NFS client 116 via the TCP/IP process.

In a preferred embodiment of the invention, NFS server 122 may include multiple server processes for implementing multiple tasks. The NFS LAN interface process dispatches work to a server process in NFS server 122, based on the contents of a "file handle," which is a parameter in the NFS request. A file handle contains such information as the type of file, the time of creation of the file, a unique identifier (file set ID) for the file set in which the file resides, a unique identifier (file ID) for the file within the file set, etc. All requests for a given file set will go through the same NFS server process. NFS server 122, which receives an NFS request from the NFS LAN interface process, gains access to OSS file system 124 via a set of system calls through interface 126.

OSS file system 124 supports disk files. It contains one or more file-system data structures called VNODEs (virtual nodes). Each file currently in use in the server has an associated VNODE. A VNODE contains various kinds of information about the state of the file, including whether it is open, where its cached data (if any) is located, the timestamps associated with the file, etc. A VNODE also contains an NFS "pseudo-open" status of the associated file. A pseudo-open describes the state of a file currently being accessed via the NFS server. In a preferred embodiment of the invention, a variable in the VNODE is used to represent the pseudo-open status of a file. The variable can have one of three values respectively representing three different file access states: not open, read-only, and read and write. In a preferred embodiment, a VNODE may additionally contain references to the disk process data structures OCB (Open Control Block) and FCB (File Control Block). OSS file system 124 includes a hashing mechanism for locating a VNODE associated with a file based on the file ID and file set ID in the file handle that is included in the NFS client request.

Also, in FIG. 1, name server 130 is responsible for file name hierarchy and provides pathname resolution. Disk process 128 performs functions relating to transfer of data to or from disk. Disk process 128 maintains two data structures associated with an open (or pseudo-open) file. The two data structures are the OCB and FCB. These data structures contain additional data about the state of the file that the disk process needs, such as where the file is located on the disk. File manager 134 in network server 106 handles messages from disk process 128 and a memory manager (not shown). Additionally, it performs open-demotion operation, as will be described in detail later.

Figure 2:
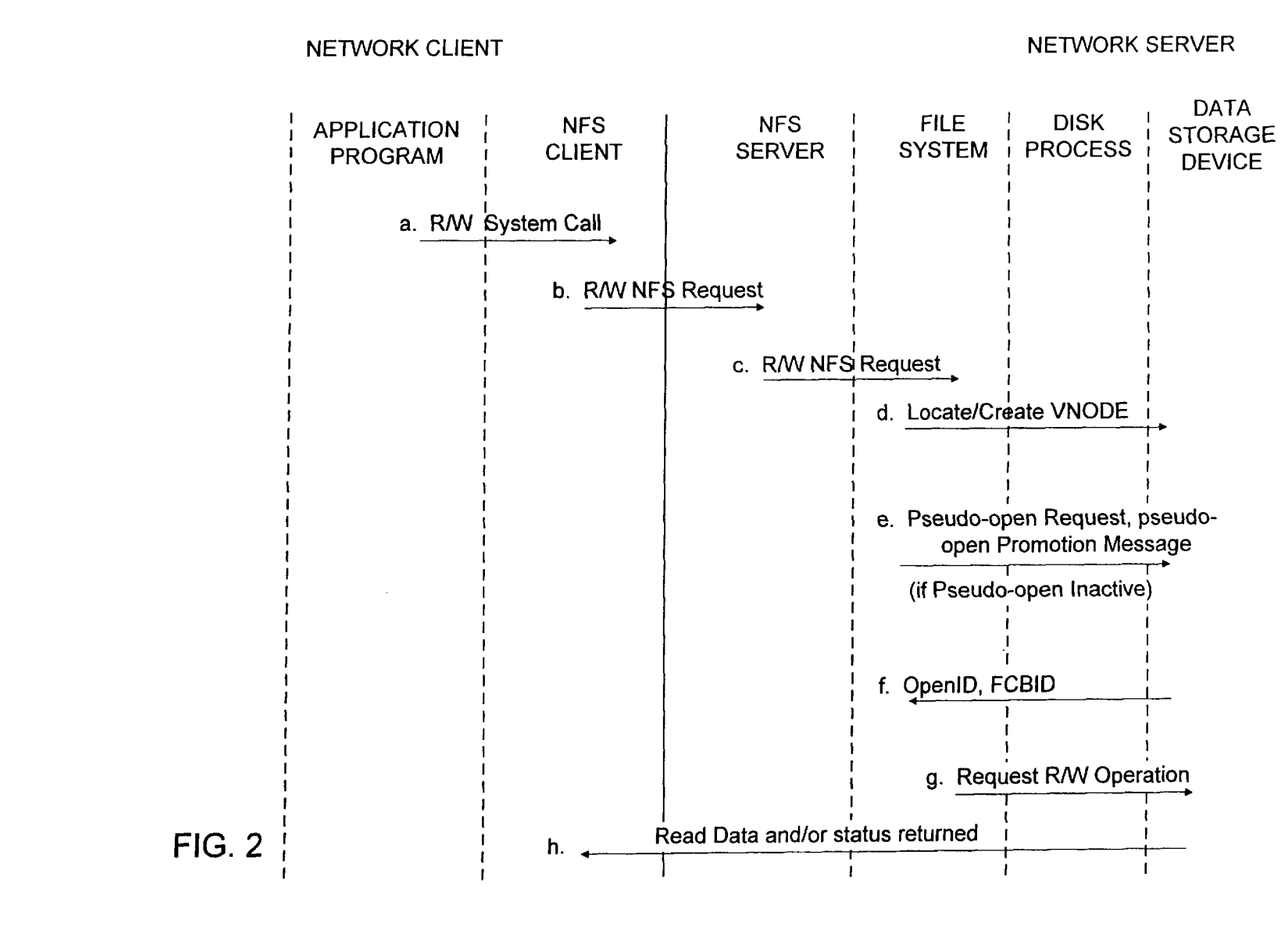
FIG. 2 illustrates the interaction between the various processes in the network client and server.

FIG. 2 shows an example of interaction between a network client and a network server. As shown, at step a, the application program is executed and sends a read or write system call to the NFS client. The NFS client sends a READ or WRITE NFS request to the NFS server at step b. This NFS request includes a file handle. A file handle, as previously described, is a data structure that contains sufficient information for uniquely identifying the file to be accessed. Then, at step c, a READ or WRITE NFS request for a file is sent by the NFS server to the OSS file system. Upon receiving the READ or WRITE NFS request, the OSS file system then attempts to locate a VNODE associated with the file using a hashing mechanism in the OSS file system at step d, based on the file ID and file set ID included in the file handle. If no VNODE is found, one is created.

Next, the OSS file system checks the VNODE to see if there is a pseudo-open state active for the file. A pseudo-open state refers to a set of data that is kept partially by the file system 124 and partially by the disk process 128 that describes the state of a file being currently accessed via the NFS server. This pseudo-open data differs from normal file state data in that it can be created or recreated at will, thus preserving the stateless functionality of the NFS server. If the pseudo-open state is active, as indicated in the VNODE, steps e and f are skipped. Thereafter, the file system issues a READ or WRITE request to the data storage device so that the READ or WRITE operation can proceed immediately, as illustrated at step h.

On the other hand, if there is no pseudo-open state in effect for the file, as is the case when a VNODE was newly created, then a pseudo-open request is created by the OSS file system and is sent to the disk process at step e. The pseudo-open request to the disk process is similar to a regular open request, with the primary exception that no specific user information is associated with the request. The pseudo-open state will be shared by all NFS clients wishing to access the file. The disk process does no security checking of the pseudo-open request to determine whether the user has an access permission for the file. Security checking will be done by the disk process for each READ or WRITE request as required by the conventional NFS protocol.

In this example, if, at step c, a READ request is received by the OSS file system, the OSS file system will send a pseudo-open request for read-only access to the disk process at step e. Write access is not specified in this case for performance reasons associated with restriction of data caching for that file during write access. Moreover, opening a file for write access locks out other file openers in the operating system for the duration of that open. On the other hand, if, at step c, a WRITE request is received by the OSS file system, the OSS file system will send a pseudo-open request for read and write access at step e, since there is no penalty for specifying read and write access instead of write-only access. In addition, if a READ request is first received by the OSS file system and then a WRITE request follows, the OSS file system will also send an "open-promotion" message to the disk process, at step e, to change the state of the file from read-only to read and write in an open-promotion operation, which will be further described in connection with FIG. 6. When the file is opened, the disk process returns an Open ID ("pseudo-open ID" in this case) and an FCBID (File Control Block ID) to the OSS file system, at step f. The Open ID and FCBID are stored in the VNODE associated with that file and reference the OCB and FCB data structures in the disk process. After the file is opened, the file system sends a request to the data storage device for a read or write operation at step g and the resultant read data and/or status is returned to the requesting client at step h.

Figure 3:
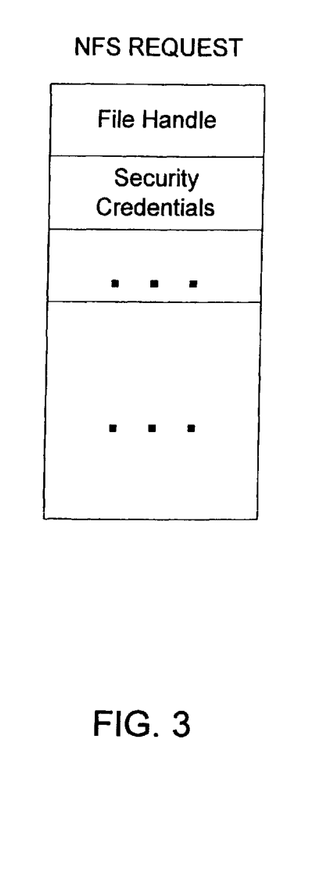
FIG. 3 shows an example format of an NFS request.

FIG. 3 shows an example format of an NFS request. As shown, an NFS request includes a file handle, security credentials, etc. A file handle, as previously described, is a data structure that contains sufficient information for uniquely identifying the file to be accessed. Security credentials provide the identity information of a user, such as the user ID, group ID, etc.

Figure 4:
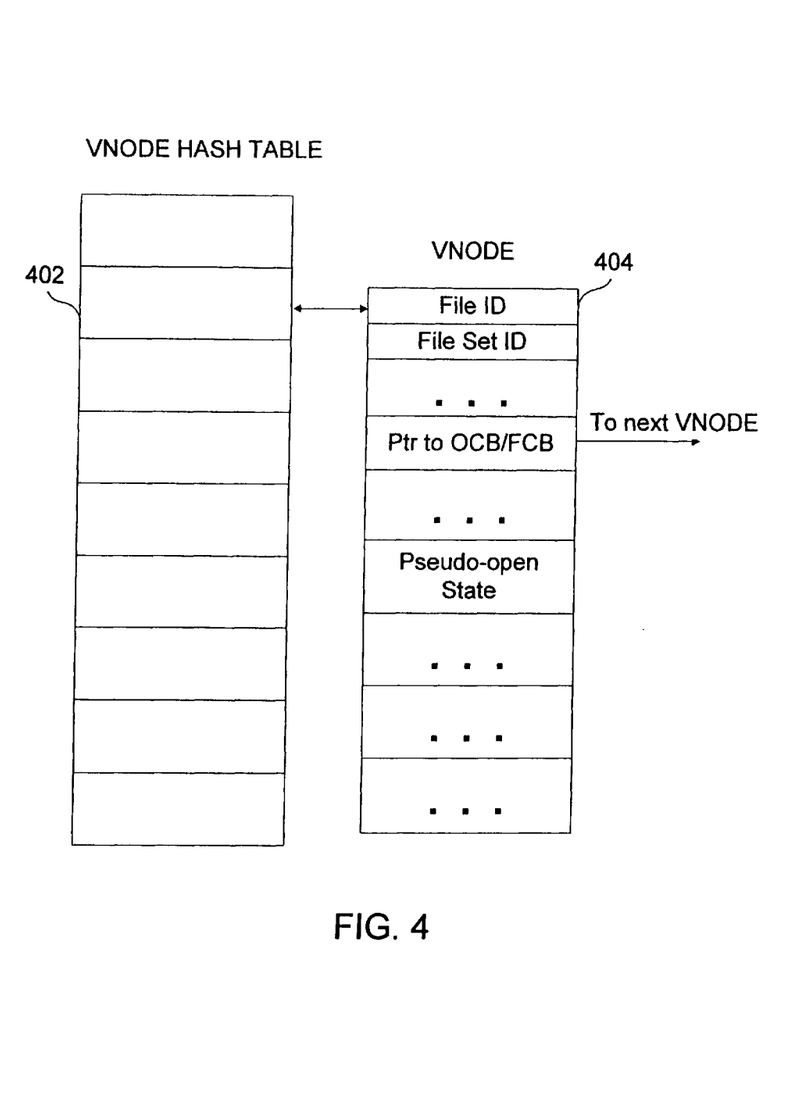
FIG. 4 shows a VNODE data structure and a VNODE hash table used in a disk file system in the network server according to a preferred embodiment of the invention.

FIG. 4 shows a VNODE hash table 402 and the data structure of a VNODE 404. The VNODE hash table is implemented as a bucket chain hash table. The hash table buckets are anchors to the VNODE chains. A VNODE contains file information on an active file in a server, including the file ID and file set ID. A VNODE also contains the pseudo-open state of an associated file. Each active file in the server has one VNODE.

When the OSS file system tries to locate the VNODE for a particular file for determining whether the pseudo-open state is active, it first obtains the file ID and file set ID of the file from the file handle in the NFS request. Then, the file ID and file set ID are hashed to determine the bucket of the VNODE hash table to which the VNODE belongs. There are multiple VNODEs hashed into the same bucket. The VNODEs are linked together by a link list.

Figure 5:
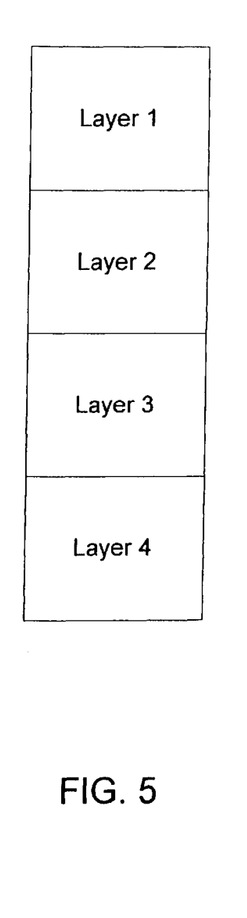
FIG. 5 shows the software structure of a disk file system according to a preferred embodiment of the invention.

FIG. 5 depicts four software layers relating to the structure of the OSS file system according to a preferred embodiment of the invention. Layer 1 provides the OSS file system interfaces and callable routines for the NFS server. Layer 1 also performs various initializations of software blocks. Layer 1 invokes layer 2 routines. Layer 2 manages global structures, such as file system switch, VNODE hash table, etc. Layer 2 also locates, creates, and stores VNODEs and the VNODE hash list. Moreover, layer 2 invokes layer 3 routines. Layer 3 includes disk file system dependent routines. It manages disk file system specific data structures. Layer 3 also performs open and open-promotion operations. Layer 3 invokes layer 4 routines. Layer 4 creates and transmits messages to the disk process.

Figure 6:
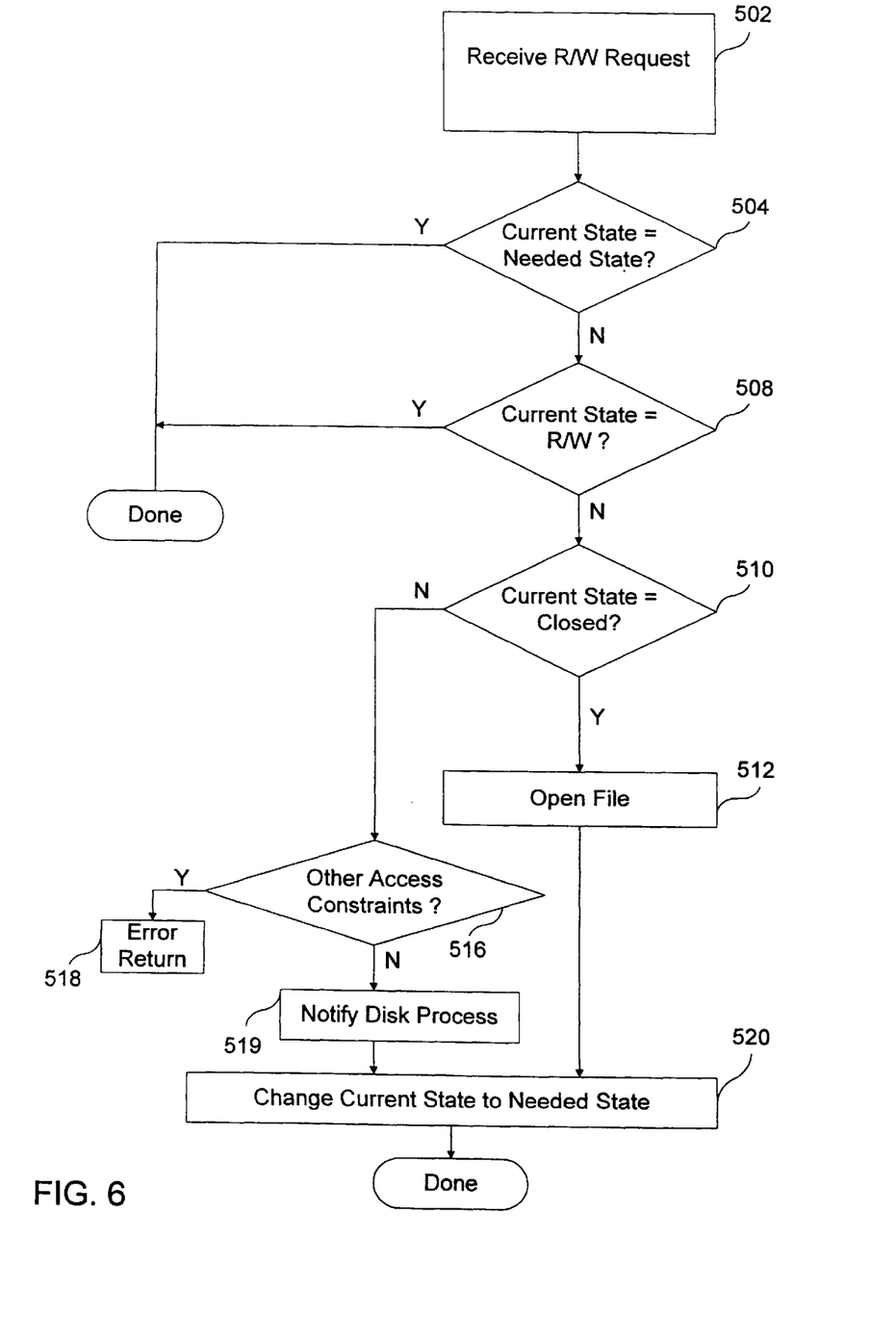
FIG. 6 shows a flowchart illustrating an open-promotion operation performed by the disk file system according to a preferred embodiment of the invention.

FIG. 6 illustrates the open promotion operation performed by layer 3 of the OSS file system. As shown at step 502, a read and/write request from the NFS server 122 is received by the OSS file system 124. The needed state of the request may be one of the two states: read-only, and read and write. The file system obtains the information about the current access state of the file from an associated VNODE. The current access state may be read-only, read-and-write, or closed.

At step 504, the file system determines whether the current state of the file matches the needed state indicated by the read or write request. If there is a match, then no further processing is needed. The file already has the appropriate state for the requested operation. If the current file state is not the same as the needed state, the file system then determines whether the current file state is a read and write state at step 508. If so, the file again has the appropriate state for the requested operation and the processing is completed. However, if the current file state is not a read and write state, the file system determines whether the current file state is closed at step 510.

If the current file state is closed, the file system establishes a pseudo-open for the file at step 512. On the other hand, if the current file state is not closed, the disk process checks whether there are other access constraints placed on the user at step 516, such as whether someone else has locked out the file or is accessing the file. If there are such constraints, an error status is returned to the user at step 518. If, however, there are no access constraints, an open-promotion request is sent to the disk process at step 519. The file system then changes the current state in the VNODE to the needed state at step 520. That is, the variable in the VNODE that represents the pseudo-open status is changed to the needed state. In this embodiment, an open-promotion operation is performed by changing the current access state of the file from read-only to read-and-write when a request for a write access is received. In an alternative embodiment, an open-promotion operation may be performed by changing the current access state of a file from write-only to read-and-write when a request for a read access is received.

Figure 7:
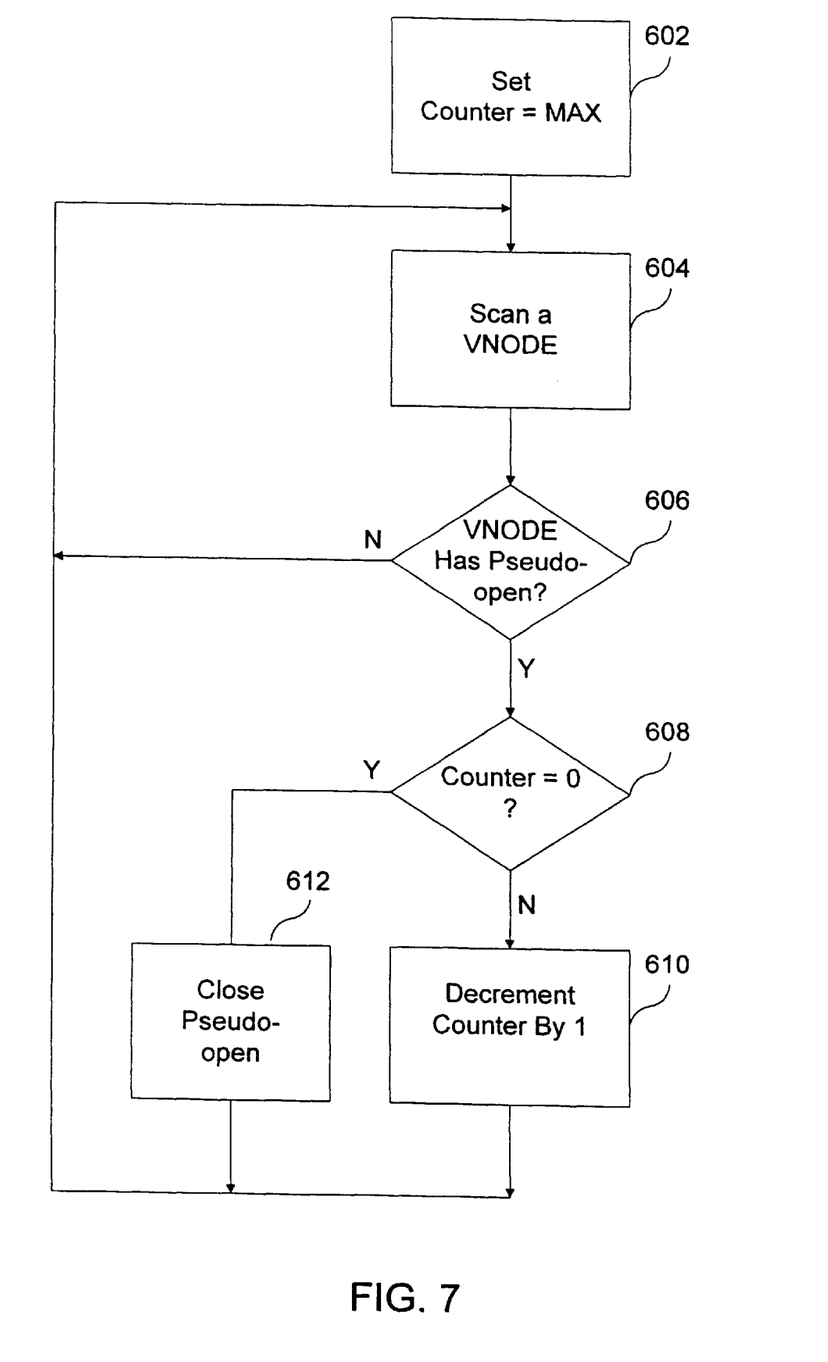
FIG. 7 shows a flowchart illustrating an operation of closing a pseudo-open state performed by the file manager according to a preferred embodiment of the invention.

FIG. 7 illustrates an operation of closing a pseudo-open state performed by the file manager according to a preferred embodiment of the invention. In this embodiment, a software (or hardware) counter is associated with each file. Whenever a READ, WRITE or other NFS request is received for a file, the file system (layer 3) sets a counter for the file to a pre-configured maximum value, such as 2, as illustrated at step 602. When the file manager is not busy with other work, it "wakes up" periodically on a timer, e.g., once every second. At such times it scans all VNODEs as illustrated at step 604. The file manager then determines whether each VNODE has a pseudo-open active at step 606. If the VNODE does not have an active pseudo-open, the file manager will scan another VNODE at step 604. However, if there is a pseudo-open active in the VNODE, the file manager determines, at step 608, whether the counter associated with the file has decremented to zero. If the counter is not zero, the file manager decrements the counter by one at step 610. On the other hand, if the counter is zero, the file manager closes the pseudo-open for the file at step 612, and then scans another VNODE at step 604. If no other processes in the server are using the file, then the VNODE is deleted. Thus, even though the client never sends a "close file" request, pseudo-open files are eventually closed if they have not been accessed for a predetermined time.

Figure 8:
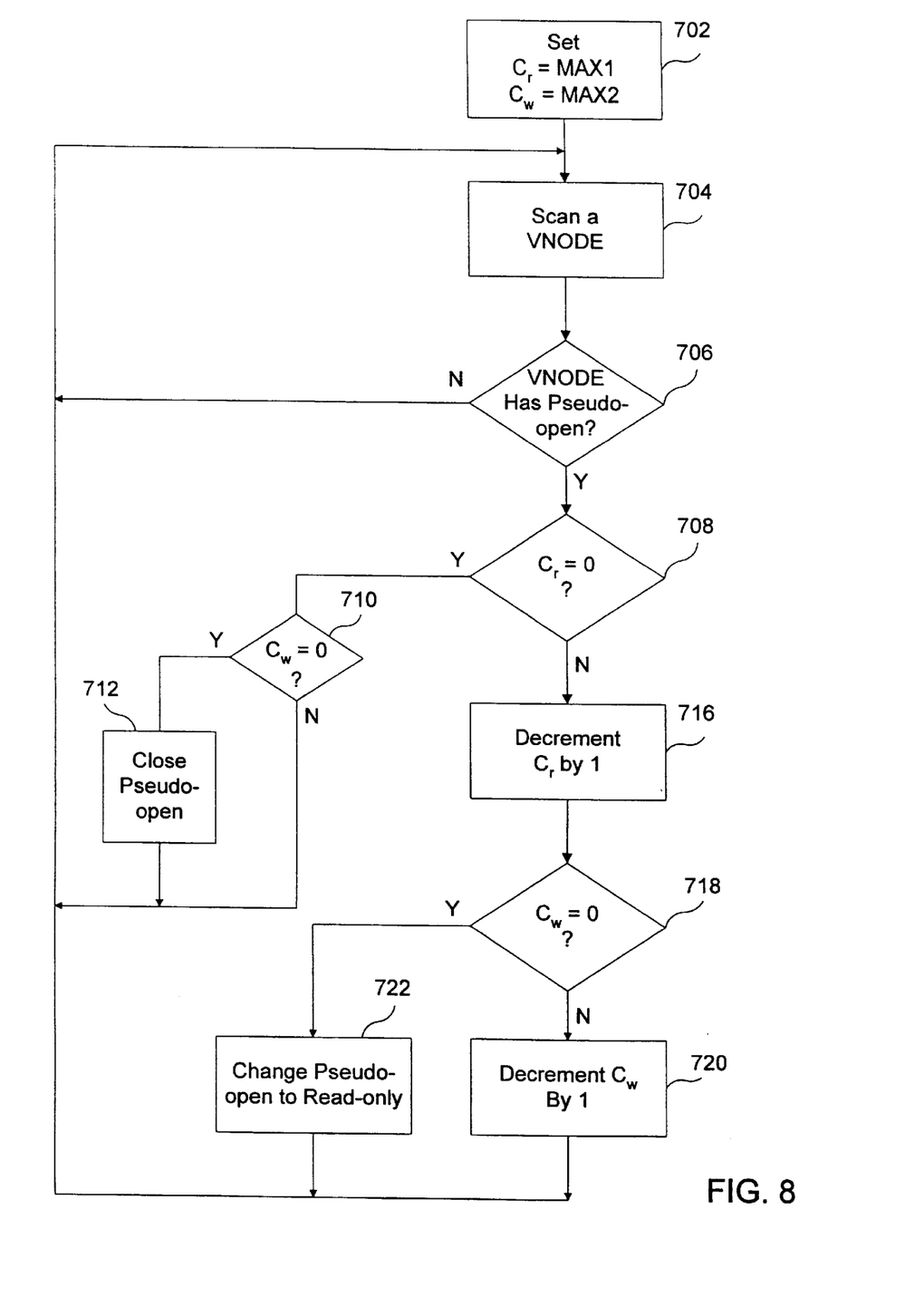
FIG. 8 shows a flowchart illustrating an open-demotion operation performed by the file manager according to a preferred embodiment of the invention.

FIG. 8 illustrate an open-demotion operation performed by the file manager according to a preferred embodiment of the invention. In this embodiment, a read counter $C_r$ and a write counter $C_w$ are associated with each file. When a READ, WRITE or other NFS request is received, the file manager sets a first configured maximum value for an associated read counter $C_r$ or a second configured maximum value for an associated write counter $C_w$, as illustrated at step 702. Thus, $C_r$ is set whenever a READ request is processed, and $C_w$ is set whenever a WRITE request is processed. When the file manager is not busy with other work, it wakes up periodically (e.g., once every second) on a timer. During such times, it scans all VNODEs to close unwanted pseudo-open states and to perform open-demotion operations. At step 706, the file manager determines whether a VNODE has a pseudo-open active. If the VNODE does not have a pseudo-open active, the file manager scans another VNODE. However, if the VNODE has a pseudo-open active, the file manager then determines whether the associated read counter $C_r$ is equal to zero, at step 708. If $C_r$ is equal to zero, the file manager next determines whether the associated write counter $C_w$ is also equal to zero, at step 710. If $C_w$ is also equal to zero, the file manager will close the pseudo-open for the file at step 712 and scan the next VNODE.

On the other hand, if the file manager determines that $C_r$ is not equal to zero at step 708, the file manager decrements $C_r$ by one at step 716. It then determines whether the write counter $C_w$ is equal to zero at step 718. If $C_w$ is not equal to zero, the file manager decrements $C_w$ by one at step 720 and then scans the next VNODE. If $C_w$ is equal to zero, the file manager will change the pseudo-open to read-only at step 722, notify the disk process, and scan the next VNODE.

While the invention has been described in conjunction with specific embodiments, it is evident that many alternatives, modifications and variations will be apparent to those skilled in the art in light of the foregoing description. For example, the described functions can be distributed among processes in the file server, differently than described herein without departing from the spirit of the present invention. Accordingly, it is intended to embrace all such alternatives, modifications and varitions as fall within the spirit and scope of the appended claims and equivalents.

What is claimed is:

1. A method of interfacing between a network client and a network server, comprising the steps of:
    (a) receiving a request from the network client for accessing a file in the network server;
    (b) determining if there is a pseudo-open state for the file in the server, the pseudo-open state can be created and recreated at will; and
    (c) establishing a pseudo-open state for the file in the server if there is no pseudo-open state for the file, the pseudo-open state being associated with a pseudo-open identification and kept in the server partially by a file system and partially by a disk process.

2. The method of claim 1, wherein step (b) includes the step of locating a data structure that stores the pseudo-open state of the file, each file currently in use by the server having such a data structure.

3. The method of claim 2, wherein step (c) includes the step of creating the data structure if no such data structure is found for the file.

4. The method of claim 1, further comprising, after step (b), issuing a pseudo-open request if there is no pseudo-open state for the file.

5. The method of claim 4, wherein the pseudo-open request is similar to a regular open request without specific user information associated with the pseudo-open request, and no security checking is performed with respect to the pseudo-open request.

6. The method of claim 1, further comprising the steps of:
    (d) determining whether the request is for a read or write access;
    (e) determining the current access state of the file; and
    (f) if the current access state of the file is read only and the request is for a write access, changing the current access state of the file to read and write.

7. The method of claim 1, further comprising the steps of:

(d) associating a counter with the file;

(e) configuring a maximum value for the counter;

(f) periodically checking the value of the counter;

(g) if the value of the counter is non-zero, decrementing the value of the counter; and (h) if the value of the counter is zero, closing the pseudo-open state for the file.

8. The method of claim 1, further comprising the steps of:

(d) associating a read counter and a write counter with the file;

(e) setting the read counter to a first maximum value whenever an NFS READ request is processed;

(f) setting the write counter to a second maximum value whenever an NFS WRITE request is processed;

(g) periodically checking the values of the read and write counters; and (h) if the read counter has a non-zero value but the write counter has a zero value, changing the state of the pseudo-open to read-only.

9. A method of interfacing between a network client and a network server, the network server including an NFS server, a file system and a disk process, the method comprising the steps of:

(a) receiving, by the NFS server, a request from the network client for accessing a file in the network server;

(b) locating, by the file system, a data structure associated with the file in file system, each file currently in use having such a data structure;

(c) creating, by the file system, the data structure for the file if the data structure is not found for the file;

(d) checking, by the file system, the data structure to determine if there is a pseudo-open state for the file in the network server, the pseudo-open state can be created and recreated at will; and (e) issuing, by the file system, a pseudo-open request to the disk process for establishing the pseudo-open state for the file if there is no pseudo-open state for the file, the pseudo-open state being associated with a pseudo-open identification and kept in the server partially by a file system and partially by a disk process.

10. The method of claim 9, further comprising the step of performing, by the disk process, a read or write operation with respect to the file in accordance with the request from the network client.

11. The method of claim 9, wherein the pseudo-open request is similar to a regular open request without specific user information associated with the request and the disk process does not perform security checking with respect to the pseudo-open request.

12. The method of claim 11, wherein the network server further includes a file manager, and the method further comprising the steps of:

(d) determining, by the file manager, whether the request from the network client is for a read or write access;

(e) determining, by the file manager, the current access state of the file; and (f) if the current access state of the file is read-only and the request is for a write access, changing, by the file manager, the current access state of the file to read and write.

13. The method of claim 9, further comprising the steps of:

(d) associating, by the file system, a counter with the file;

(e) configuring, by the file manager, a maximum value for the counter;

(f) periodically checking, by the file manager, the value of the counter;

(g) if the value of the counter is non-zero, decrementing, by the file manager, the value of the counter; and (h) if the value of the counter is zero, closing, by the file manager, the pseudo-open state for the file.

14. The method of claim 9, further comprising the steps of:

(d) associating, by the file system, a read counter and a write counter with the file;

(e) setting, by the file manager, the read counter to a first maximum value whenever an NFS READ request is processed;

(f) setting the write counter to a second maximum value whenever an NFS WRITE request is processed;

(g) periodically checking, by the file manager, the values of the read and write counters; and (h) if the read counter has a non-zero value but the write counter has a zero value, changing, by the file manager, the state of the pseudo-open to read only.

15. An apparatus for interfacing between a network client and a network server, comprising:

a first portion in the network server configured to receive a request from the network client for accessing a file in the network server;

a second portion in the network server configured to locate a data structure associated with the file in file system, each file currently in use having such a data structure;

a third portion in the network server configured to create the data structure for the file if the data structure is not found for the file;

a fourth portion in the network server configured to check the data structure to determine if there is a pseudo-open state for the file, the pseudo-open state can be created and recreated at will; and a fifth portion in the network server configured to issue a pseudo-open request to the disk process for establishing the pseudo-open state for the file if there is no pseudo-open state for the file, the pseudo-open state being associated with a pseudo-open-identification and kept in the server partially by a file system and partially by a disk process.

16. The apparatus of claim 15, further comprising a sixth portion in the network server configured to perform a read or write operation with respect to the file in accordance with the request from the network client.

17. The apparatus of claim 16, wherein the pseudo-open request is similar to a regular open request without specific user information associated with the request and the sixth portion does not perform security checking with respect to the pseudo-open request.

18. The apparatus of claim 17, further comprising:

a sixth portion in the network server configured to determine whether the request is for a read or write access;

a seventh portion in the network server configured to determine the current access state of the file; and an eight portion in the network server configured to, if the current access state of the file is read-only and the request is for a write access, change the current access state of the file to read and write.

19. The apparatus of claim 15, further comprising:

a sixth portion in the network server configured to associate a counter with the file;

a seventh portion in the network server configured to configure a maximum value for the counter;

an eighth portion in the network server configured to periodically check the value of the counter;

a ninth portion in the network server configured to, if the value of the counter is non-zero, decrement the value of the counter; and a tenth portion in the network server configured to, if the value of the counter is zero, close the pseudo-open state for the file.

20. The apparatus of claim 15, further comprising:

(d) a sixth portion in the network server configured to associate a read counter and a write counter with the file;

(e) a seventh portion in the network server configured to set the read counter to a first maximum value whenever an NFS READ request is processed;

(f) an eighth portion in the network server configured to set the write counter to a second maximum value whenever an NFS WRITE request is processed;

(g) a ninth portion in the network server configured to periodically check the values of the read and write counters; and (h) a tenth portion in the network server configured to, if the read counter has a non-zero value but the write counter has a zero value, change the state of the pseudo-open to read-only.

21. The apparatus of claim 18, further comprising:

a ninth portion in the network server configured to, if the current access state of the file is write-only and the request is for a read access, change the current access state of the file to read and write.

22. The method of claim 6, further comprising the step of:

(g) if the current access state of the file is write-only and the request is for a read access, changing the current access state of the file to read-and-write.

23. The method of claim 12, further comprising the step of:

(g) if the current access state of the file is write-only and the request is for a read access, changing, by the file manager, the current access state of the file to read-and-write.

24. A method of interfacing between a network client and a network server, comprising the steps of:

(a) receiving a request from the network client for accessing a file in the network server;

(b) determining if there is a pseudo-open state for the file in the server; and (c) establishing a pseudo-open state for the file in the server if there is no pseudo-open state for the file (d) determining whether the request is for a read or write access;

(e) determining the current access state of the file; and (f) if the current access state of the file is read only and the request is for a write access, changing the current access state of the file to read and write.

25. The method of claim 24, wherein the pseudo-open state is associated with a pseudo-open identification.

26. The method of claim 24, wherein step (b) includes the step of locating a data structure that stores the pseudo-open state of the file, each file currently in use by the server having such a data structure.

27. The method of claim 26, wherein step (c) includes the step of creating the data structure if no such data structure is found for the file.

28. The method of claim 24, further comprising, after step (b), issuing a pseudo-open request if there is no pseudo-open state for the file.

29. The method of claim 28, wherein the pseudo-open request is similar to a regular open request without specific user information associated with the pseudo-open request, and no security checking is performed with respect to the pseudo-open request.

* * * * *